(12) United States Patent
Malki et al.

(10) Patent No.: US 8,078,328 B2
(45) Date of Patent: Dec. 13, 2011

(54) SYSTEM, PROGRAM PRODUCT, AND RELATED METHODS FOR PERFORMING AUTOMATED REAL-TIME RESERVOIR PRESSURE ESTIMATION ENABLING OPTIMIZED INJECTION AND PRODUCTION STRATEGIES

(75) Inventors: Said S. Malki, Dhahran (SA); Meshal M. Buraikan, Dhahran (SA); Rami Ahmed Al-Abdulmohsin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 401 days.

(21) Appl. No.: 12/434,775

(22) Filed: May 4, 2009

(65) Prior Publication Data

US 2009/0276100 A1 Nov. 5, 2009

Related U.S. Application Data

(60) Provisional application No. 61/050,226, filed on May 3, 2008.

(51) Int. Cl.
*G06F 19/00* (2006.01)
(52) U.S. Cl. ....... 700/282; 703/10; 367/83; 166/250.02; 166/250.07; 166/250.16; 340/853.2; 340/853.3; 340/853.7; 73/1.57
(58) Field of Classification Search .................. 700/282; 367/83; 340/853.2, 853.3, 853.7; 73/1.57; 703/10; 166/250.07, 250.02, 250.16
See application file for complete search history.

(56) References Cited

U.S. PATENT DOCUMENTS

| | | | | |
|---|---|---|---|---|
| 4,988,389 | A | * | 1/1991 | Adamache et al. ........... 166/302 |
| 5,311,484 | A | * | 5/1994 | Anderson et al. ............... 367/38 |
| 5,934,371 | A | | 8/1999 | Bussear et al. |
| 6,873,267 | B1 | * | 3/2005 | Tubel et al. ................. 340/853.3 |
| 2005/0038603 | A1 | | 2/2005 | Thomas et al. |
| 2009/0276100 | A1 | * | 11/2009 | Malki et al. ................... 700/282 |
| 2010/0299125 | A1 | * | 11/2010 | Ding et al. ........................ 703/10 |
| 2011/0088895 | A1 | * | 4/2011 | Pop et al. .................... 166/254.2 |

OTHER PUBLICATIONS

Abdulaziz O. Kaabi et al., "Haradh-III: Industry's Largest Field Development With Maximum-Reservoir-Contact Wells, Smart-Well Completions, and the iField Concept". p. 444-447, Nov. 2008 SPE Production & Operations, 2008 Society of Petroleum Engineers.

Rabea Ahyed, et al., SPE 117076, "Advanced Technology and Innovative Solutions Drive Field Development in Saudi Arabia", p. 1-5, 2008, Society of Petroleum Engineers.

(Continued)

*Primary Examiner* — Michael D Masinick
(74) *Attorney, Agent, or Firm* — Bracewell & Giuliani, LLP

(57) ABSTRACT

Systems, program product, and methods for providing real-time reservoir management of one or more reservoirs across one or more fields are provided. A system can include multiple monitoring wells and at least one injection well in communication with a central facility including a reservoir management computer or server positioned to provide real-time reservoir management of the one or more reservoirs. The computer can include, stored in memory, reservoir management program code, which when executed, can cause the computer to perform the operations of calibrating an injection well model for each of one or more injection wells positioned in a reservoir responsive to real-time injection rate and wellhead pressure data associated therewith, calculating static reservoir pressure for each of the injection wells responsive to the respective calibrated injection well model and responsive to respective surface injection rate and wellhead pressure data, and generating real-time automated isobaric pressure maps.

25 Claims, 11 Drawing Sheets

OTHER PUBLICATIONS

Khalid M. Al-Salem, et al., SPE 113550, "Real Time Well Placement above a Tar Mat, Leveraging Formation Pressure While Drilling and Pyroltic Oil-Productivity Index Technologies", p. 1-6, 2008, Society of Petroleum Engineers.

International Preliminary Report on Patentability for PCT/US2009/042695, dated Nov. 9, 2010, 8 pages.

The International Search Report and the Written Opinion for PCT/US2009/042695 Dated Nov. 2, 2009.

Al-Malki S., et al.; "I-Field Capabilities Enable Optimizing Water Injection Strategies in Saudi Arabian Newly Developed Oil Fields"; Society of Petroleum Engineers, SPE; XP002551276; Dated May 10, 2008.

Al-Dossary F, et al.; "Experiences and Benefits Gained Through Implementation of the First Intelligent Field in Saudi Aramco (Qatif Field)"; Society of Petroleum Engineers, SPE; XP002551277; Dated Nov. 3, 2008.

Al-Arnaout H I, et al.; "Production Engineering Experience With the First I-Field Implementation in Saudi Aramco at Haradh-III: Transforming Vision to Realty"; Society of Petroleum Engineers, SPE; XP002551278; Dated Feb. 25, 2008.

Sengul M, et al.; "Applied Production Optimization: i-Field"; Society of Petroleum Engineers, SPE; XP002551279; Dated Sep. 29, 2002.

* cited by examiner

SYSTEM, PROGRAM PRODUCT, AND RELATED METHODS FOR PERFORMING AUTOMATED REAL-TIME RESERVOIR PRESSURE ESTIMATION ENABLING OPTIMIZED INJECTION AND PRODUCTION STRATEGIES

RELATED APPLICATIONS

This application is a non-provisional application which claims priority to and the benefit of U.S. Provisional Patent Application No. 61/050,226, titled "System, Program Product, And Related Methods For Performing Automated Real-Time Reservoir Pressure Estimation Enabling Optimized Injection And Production Strategies," filed on May 3, 2008, incorporated herein by reference in its entirety.

BACKGROUND OF THE INVENTION

1. Field of the Invention

The present invention relates generally to the oil industry, particularly reservoir engineering, and more particularly to systems, program product, and methods for providing real-time reservoir management of one or more oil reservoirs across one or more oilfields.

2. Description of Related Art

Various types of recovery methodologies are used to recover crude oil or other hydrocarbons. A primary methodology for recovering oil, for example, includes use of natural underground pressure, which can originate from several sources including an underlying water layer below the oil layer or a gas cap formed of gas collected immediately above the oil layer. Whether or not such underground pressure initially existed, once reservoir pressure has either been depleted or is otherwise below a minimum value, oil must be brought to the surface using secondary methodologies. One of the secondary methodologies includes injecting water below the oil layer. Another methodology includes injecting a gas above the oil layer. Other methodologies of extracting oil, particularly when underground pressure has been depleted to a point where the reservoir cannot be sufficiently pressurize, can include reducing the viscosity through the injection of heat, vapor, surfactants, solvents, or miscible gases (e.g., carbon dioxide). Efficient reservoir management may dictate maintaining underground pressure using one of the above methodologies, rather than allowing reservoir pressure to be depleted.

Water is a particularly useful tool in reservoir management in that it can be used to, not only pressurize a virgin or depleted reservoir (both naturally or through injection), but can also be used to proactively maintain reservoir pressure and/or to direct oil in a reservoir toward an existing oil well. Various reservoir/field characteristics that may lead to a requirement to use water injection can include, for example, the existence of tight flank permeability or the existence of a non-permeable tar mat. Tight flank permeability can prevent enough aquifer support from reaching the crest area of the field.

Various methodologies including, for example, the use of long reach flank injectors with multi-kilometer reservoir exposure can provide adequate injection rates to support the producing area of the affected reservoir. The presence of a non-permeable tar mat across the flanks of the field, however, can prevent aquifer support from reaching the producing area. Various methodologies including, for example, drilling or reactivating up-dip injectors placed above the tar-oil contact layer can provide for adequate injection rates to support the producing area. In order to determine such location, a data-gathering project may be employed to properly map the tar mat. With knowledge of the structure of the non-permeable tar mat, the water can be injected using high pressure, high flow rate pumps, which can each include a wellhead pressure sensor and flow rate meter. Water injection, however, is a progressive process which includes a substantial lag time between injection of the water and a pressure increase or oil migration in the vicinity of a targeted section of the reservoir or a specific well or wells.

As such, it can be readily understood that, until now, substantial challenges have prevented efficient reservoir management through water injection, particularly when there exists a significantly large non-permeable tar mat and/or tight flank permeability. For example, reservoir engineers, using conventional technology and methods, have been challenged with trying to understand reservoir performance based on a few static pressure surveys conducted across key wells, annually or biannually. Such lack of continuous data lowers or minimizes their understanding of important reservoir performance messages and may result in missing significant production injection optimization opportunities. Producing operators, using conventional technology and methods in order to try to meet reservoir engineering pressure survey requirements, for example, are challenged with the difficulties associated with having to shut-in each key well one day before the survey and at least one day during the survey, which results in a loss of production or injection, and are challenged with the difficulties of a shut-in time beyond one week beforehand for wells in tight reservoirs, in order to obtain a representative static reservoir pressure value. Producing operators are also challenged with providing the required logistics to perform the required annual/biannual surveys including manpower and survey equipment, e.g., wireline truck, pressure gauges, etc.

Accordingly, recognized by the inventors is the need for systems, program product, and methods of providing real-time reservoir management of multiple reservoirs across one or more fields: that can provide continuous data that allows reservoir engineers to maximize their understanding of important reservoir performance messages and to identify production injection optimization opportunities; that can negate a need for shutting down a well in order to obtain representative static reservoir (e.g., bottom hole) pressure values, allowing for substantially continuous producing operations; and that does not require the performance of annual/biannual wireline surveys or the associated logistics, e.g., manpower and survey equipment including a wireline truck, pressure gauges, etc., needed to perform such annual/biannual wireline surveys.

Additionally, various reservoirs can have different crude grades potentially resulting in a need to adjust production across the different reservoirs in order to obtain a required or desired crude blend. To overcome such challenge, the inventors have recognized the need for real-time data including, rate, pressure and temperature, collected across the entire network, from reservoir to central producing facility, and matched, for example, using an integrated model for more efficient, real-time reservoir reservoir pressure estimations and enhanced real-time reservoir management.

SUMMARY OF THE INVENTION

In view of the foregoing, various embodiments of the present invention advantageously provide a system, program product, and methods of providing real-time reservoir management of multiple reservoirs across one or more fields that can provide continuous data, and which allows reservoir engineers to maximize their understanding of important reservoir performance messages and to identify production injection optimization opportunities. Various embodiments of the present invention also advantageously provide a system, program product, and methods of providing real-time reservoir management of multiple reservoirs across one or more fields that can negate a need for shutting down a well in order to obtain representative static reservoir (e.g., bottom hole) pressure values—allowing for substantially continuous producing operations, and that does not require the performance of annual/biannual wireline surveys or the associated logistics, e.g., manpower and survey equipment including a wireline truck, pressure gauges, etc., needed to perform such annual/biannual wireline surveys.

Specifically, according to an example of an embodiment of the present invention, a system of providing real-time reservoir management of one or more reservoirs across one or more fields can include a communication network employing both wireless and wireline communication media, a plurality of injection wells each positioned to inject water into a portion of a reservoir and including a wellhead pressure sensor to measure wellhead pressure, an injection rate sensor to measure an injection rate of the water when being injected, and a transceiver adapted to communicate wellhead pressure sensor and injection rate sensor data over the communication network to a central processing facility. The system can also include a plurality of monitoring wells (e.g., select producer and/or observation wells) each positioned in the reservoir and including a permanent downhole monitoring sensor (gauge/system) to provide real-time measured pressure values of reservoir pressure adjacent the respective monitoring well, and a transceiver to communicate real-time measured pressure value data over the communication network to the central processing facility. The system can further include a reservoir management computer or server positioned, for example, at the central processing facility, remote from the plurality of injection wells and the plurality of monitoring wells, and in communication with the communication network to provide real-time reservoir management of the plurality of reservoirs. The computer can include a processor and memory coupled to the processor, and reservoir management program code.

The reservoir management program code can be stored in the memory of the reservoir management computer or separately stored in an independent tangible computer readable medium, and can include instructions that when executed by a computer (e.g., the reservoir management computer or server), cause the computer to perform the operations of calibrating an injection well model for each of a plurality of injection wells positioned in at least one reservoir responsive to real-time injection rate and wellhead pressure data associated therewith, calculating static reservoir pressure for each of the plurality of injection wells responsive to die respective calibrated injection well model and responsive to respective surface injection rate and wellhead pressure data, forming at least one isobaric pressure map of one or more reservoirs to include pressure mapping data for a plurality of producer wells and the plurality of injection wells responsive to the step of estimating static reservoir pressure, and displaying the at least one isobaric pressure map on a display to provide for real-time reservoir pressure monitoring. The operation of forming can include combining the calculated (estimated) real-time static reservoir pressure for each of the plurality of injection wells with producer well reservoir pressure data measured for each of a plurality of producer wells. The operations can also include receiving real-time downhole pressure in a producing area of the at least one reservoir during a pre-injection test, determining a reservoir pressure response to water injected by at least one pre-injection test well during the pre injection test responsive to the real-time downhole pressure, and determining an optimum injection strategy responsive to the reservoir pressure response.

Various embodiments of the present invention also include a computer memory element included as part of the system or as a separate memory element and containing, stored in computer readable media, a database containing data for at least one reservoir in computer readable format. According to an embodiment of the present invention, the data can include time related injection well data including measured injection rate and wellhead pressure data for at least one injection well, an injection well model of the at least one injection well, calculated well injectivity index data for the at least one injection well model, calculated static downhole pressure data for the at least one injection well, and/or time related producer well data including measured static downhole pressure data for each of a plurality of producer wells.

Various embodiments of the present invention also include methods of providing real-time reservoir management of one or more reservoirs across one or more fields. According to an embodiment of the present invention, such a method can include the steps of calibrating an injection well model for each of at least one, but preferably a plurality of injection wells positioned in at least one reservoir responsive to collected real-time injection rate and wellhead pressure data associated therewith, estimating real-time static bottom hole reservoir pressure for each of the plurality of injection wells responsive to the respective calibrated injection well model and responsive to respective real-time current surface injection rate and wellhead pressure data, and generating at least one, but more typically, a plurality of real-time automated isobaric pressure maps for a plurality of producer wells and the plurality of injection wells responsive to the step of estimating static reservoir pressure. The maps can be generated by combining the estimated (calculated) real-time static reservoir pressure for each of the plurality of injection wells with measured real-time reservoir pressure data measured for each of a plurality of producer wells.

According to an embodiment of the method, the method can also include the steps of injecting a fluid (e.g., water) into a reservoir by at least one of the plurality of injection wells (pre-injection test well) during a pre-injection test period, measuring injection rate and wellhead pressure of the at least one pre-injection test well when conducting the pre-injection test, measuring real-time downhole pressure in a producing area of the reservoir during the pre-injection test to thereby determine a reservoir pressure response to the water injected by the at least one pre-injection test well during the pre injection test, and determining a current optimum injection strategy responsive to the reservoir pressure response. The method can further include the steps of analyzing the real-time reservoir pressure response to the current injection strategy, determining a revised optimum injection strategy responsive to the real-time analysis of the reservoir pressure response to the current injection strategy, and iteratively performing the steps of analyzing the real-time reservoir pressure response and determining a revised optimum injection strategy to thereby continuously optimize the injection strategy, over time. The method can further include the steps of remotely providing a first signal containing data to cause in real-time at least one producer well to adjust a production flow rate, and remotely providing a second signal containing data to cause in real-time at least one injection well to adjust its surface injection rate to thereby optimize overall reservoir performance for the at least one reservoir.

According to an embodiment of the method, the method can also include the steps of injecting a fluid (e.g., water) into a first reservoir during a pre-injection test period, measuring real-time downhole pressure in a producing area of the second reservoir during the pre-injection test period to thereby determine a reservoir pressure response in the second reservoir to the fluid injected in the first reservoir, and determining an existence of a fault or fracture connecting the first and a second reservoirs responsive to the reservoir pressure response of the second reservoir.

Various embodiments of the present invention advantageously combine pressure and rate data from different sources to allow engineers to better understand and manage oil reservoirs in real-time for maximum oil recovery. Various embodiments of the present invention advantageously combine integrated field management (IFM) and oil field manager (OFM) "I-Field" software capabilities to generate real-time reservoir pressure maps across both producer wells (e.g., using measured data) and injection wells (e.g., using calculated data) to aid in the management of oil reservoirs in real-time, for example, by implementing the following steps/operations: calibrating a proper injection well model with accurate well injectivity index by matching multi-rate test results; estimating real-time static bottom hole pressure (SBHP) for each injection well (injector) from real-time injection rate and injection wellhead pressure data; and combining estimated (calculated) real-time static bottom hole pressure for the injection wells with measured static bottom hole pressure measured, for example, using permanent downhole monitoring systems (PDHMS) at the producer wells, to thereby generate real-time reservoir pressure displayed, for example, in the form of automated isobaric maps. The ability to generate continuous static reservoir pressure trends for producer and injection wells, according to embodiments of the present invention, as compared to only twice per year using conventional methods, can advantageously help reservoir engineers: better understand reservoir performance for better recovery; realize savings of the cost of having to conduct expensive wireline surveys; minimize operational interruptions caused by shutting down wells/interrupting production; and optimize strategies, in real-time, for maximum oil recovery. Further, various embodiments of the present invention can be used to monitor pre-injection reservoir performance.

Various embodiments of the present invention provide an autonomous I-Field system which can automatically acquire downhole data to run a continuous reservoir simulation, in real-time, for example, to make an automated determination of optimum production and injection allocations and to make an automated decision to send commands to downhole control valves for one or more or all wells necessary to implement such autonomous automated production strategy. In other words, according to an example of an embodiment of the present invention, all of the production and injection wells can be smart wells, controlled by a central I-Field control computer/console, for example, which, based on a continuous (ongoing) reservoir simulation, can automatically provide intervention and control signals in response to expected future events as indicated by the continuously updated simulations. Further, embodiments of the present invention allow reservoir engineers to obtain information, at no additional incremental cost, to generate continuous real-time static reservoir pressure for each well, based, for example, on real-time measured data at the wellhead, which can result in: an improved understanding of reservoir performance (e.g., better recovery); a savings of the cost of conducting expensive wireline surveys; and a minimization of operational interruptions caused by shutting down wells.

Various embodiments of the present invention advantageously incorporate I-Field capabilities to monitor, in real-time, pre-injection performance of multiple (e.g., eight or more) reservoirs across multiple (e.g. three or more) fields. Further, various embodiments of the present invention advantageously provide a workflow used to monitor injection from: real-time data gathering; validation; and mapping, using, for example, permanent downhole monitoring systems and integrated surface and subsurface modeling and data mapping packages. Additionally, various embodiments of the present invention provide methodologies of integrating real-time data and modeling results to optimize a collective injection strategy for the multiple fields to provide more efficient real-time reservoir management. Further, various embodiments of the present invention provide methodologies of determining pre-injection performance, for example, for prior producing reservoirs having a significantly depleted reservoir pressures, and others.

Various embodiments of the present invention can also utilize I-field technology in multiple fields to monitor pre-injection performance, in real-time, and to adapt injection strategies accordingly, before putting the fields on production. Real-time reservoir pressure, infectivity, and injection rate data can also advantageously be utilized to better understand reservoir performance using the modeling capability, according to various embodiments of the present invention, without running costly wireline surveys.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

FIGS. 1-10 illustrate an exemplary system, program product, and methods for providing real-time reservoir management of a plurality of reservoirs across one or more fields, which can combine Integrated Field Management (IFM) and Oil Field Manager (OFM) "I-Field" capabilities to generate real-time reservoir pressure maps across the producer wells, e.g., using measured production well pressure data, and calculated injection (injector) well pressure data to aid in the management of oil reservoirs, in real-time. Such system, program product, and methods can employ a workflow which, in general, can include the steps or operations of: calibrating proper injection well models by matching, e.g., multi-rate, test results with model data; estimating real-time static reservoir pressure for each injection well, for example, from real-time rate and wellhead pressure data and the injection well model, and combining real-time producer and/or observation well static bottom hole pressure (SBHP) and the estimated static reservoir pressure at the injection wells.

Figure 1:
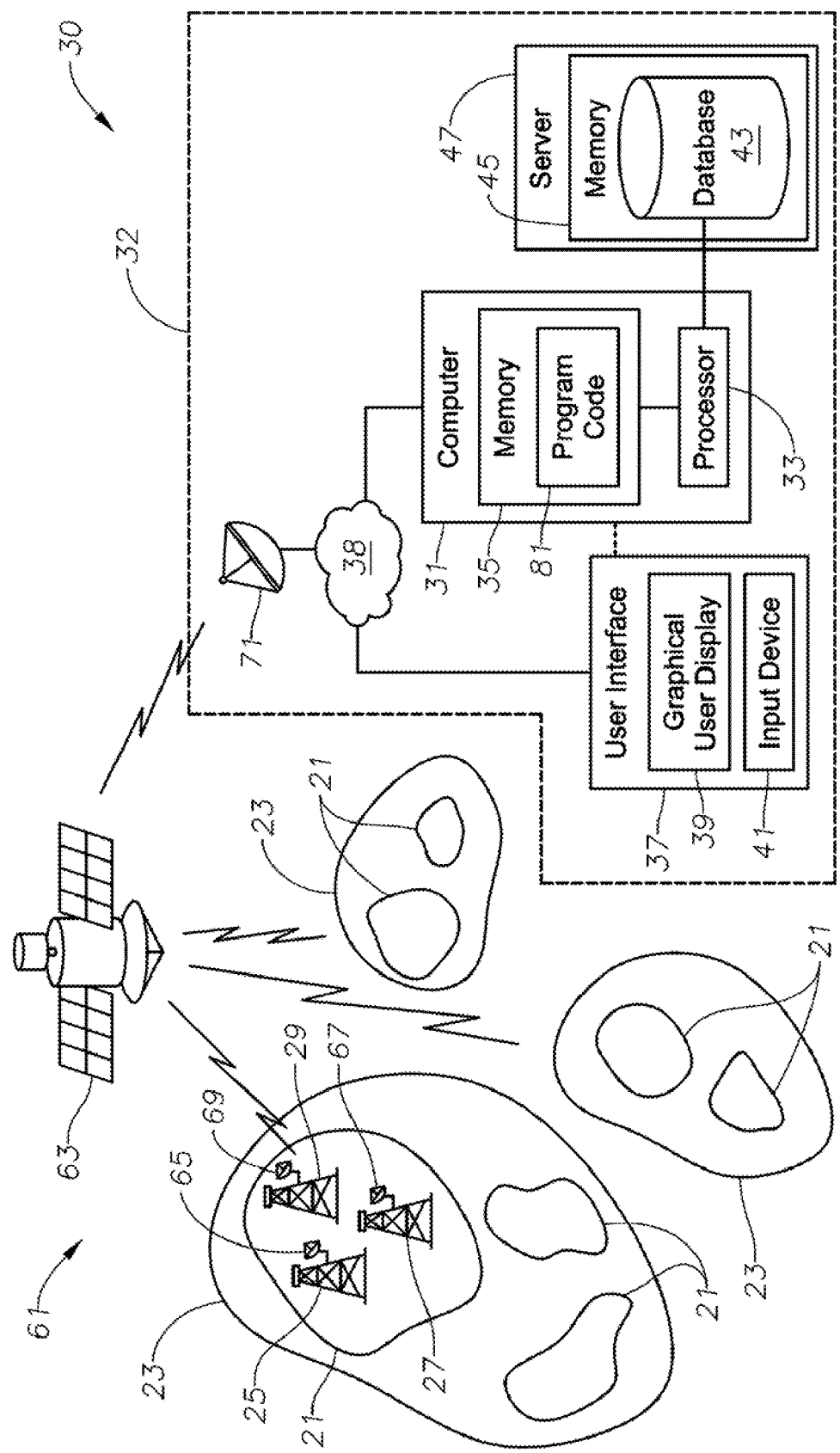
FIG. 1 is a schematic diagram of a system for providing real-time reservoir management of one or more reservoirs across one or more fields according to an embodiment of the present invention.
Figure 2:
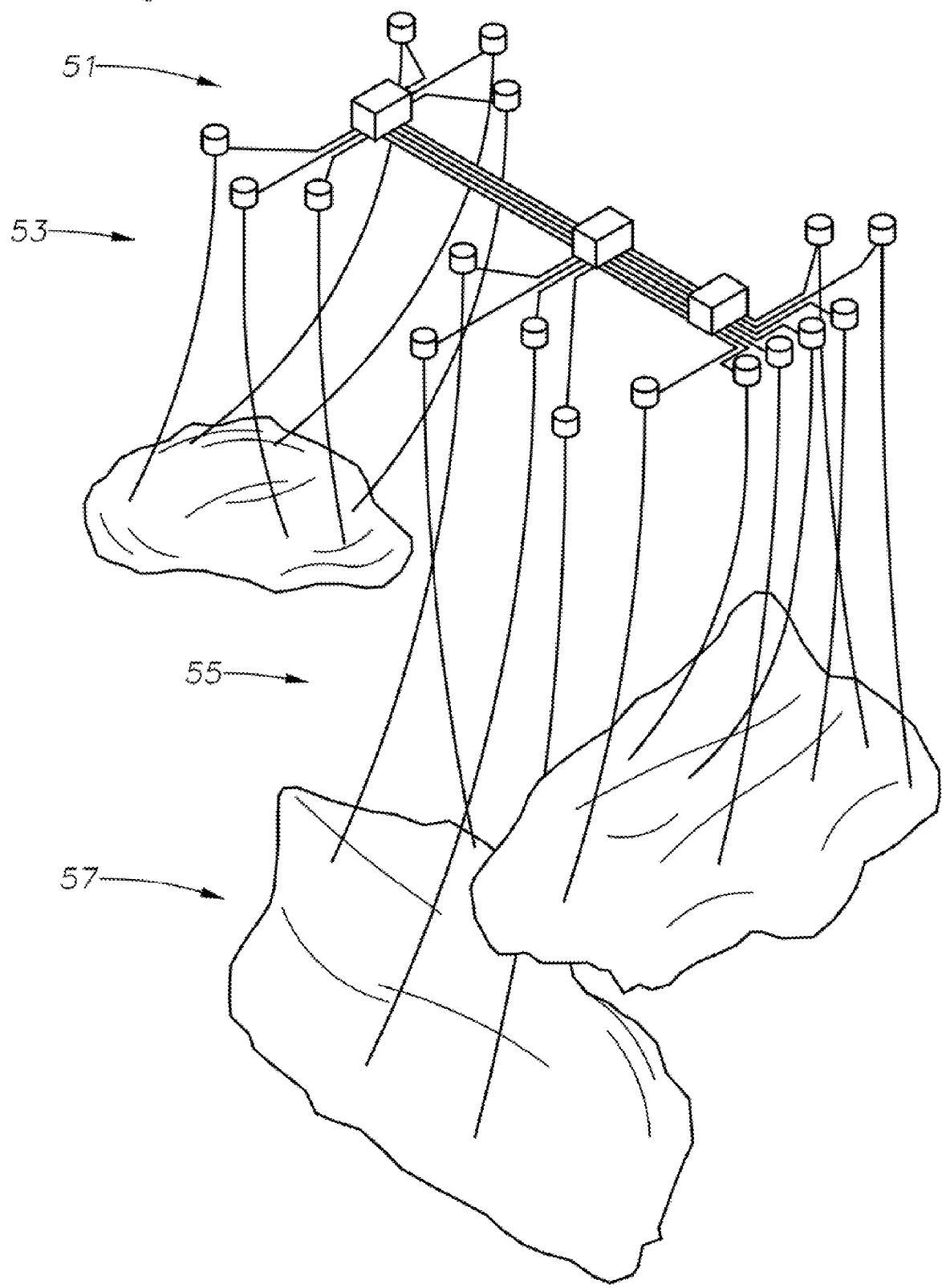
FIG. 2 is a perspective view of various models according to an embodiment of the present invention.
Figure 3:
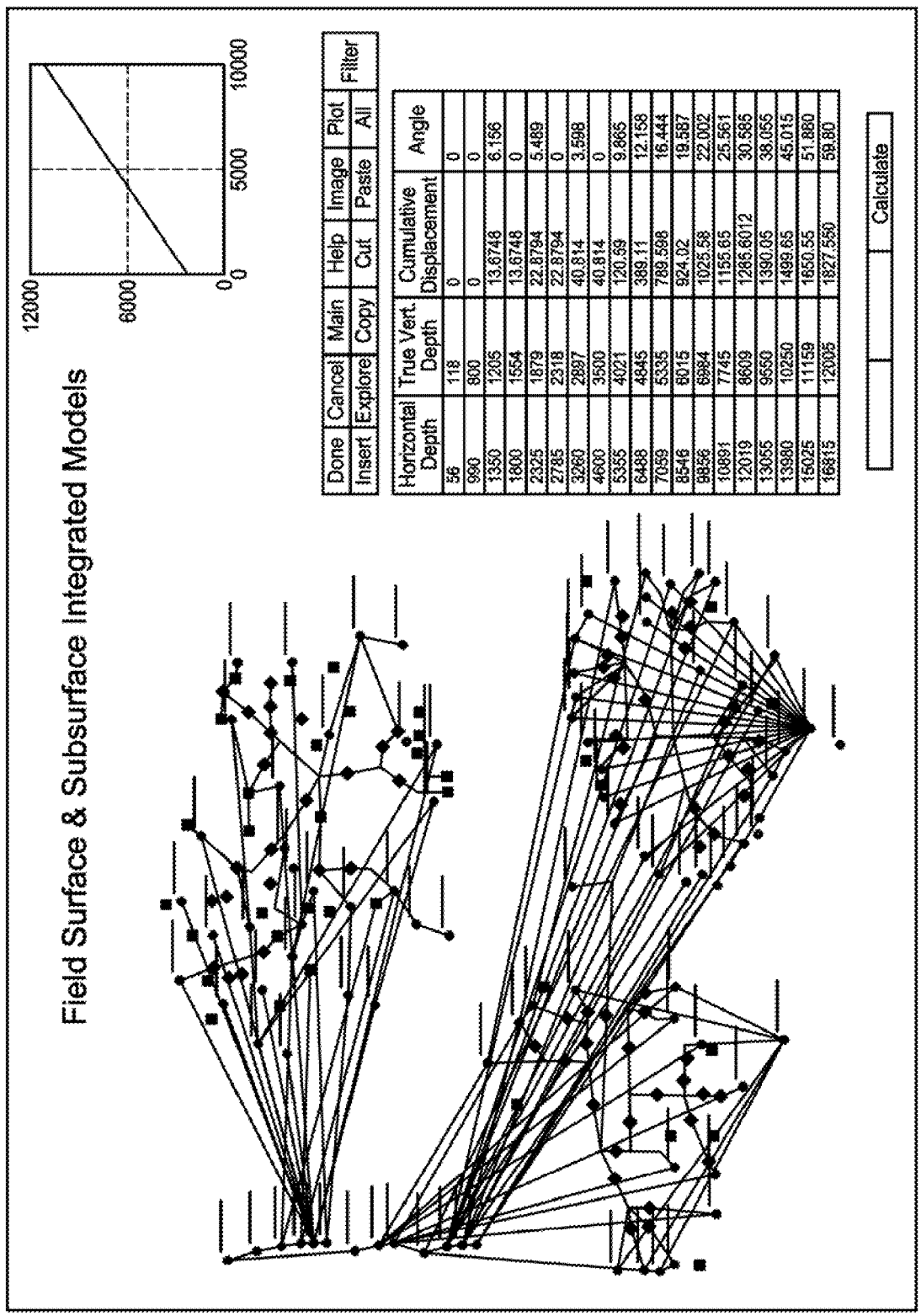
FIG. 3 is a schematic diagram of a graphical user interface illustrating field surface and subsurface integrated models according to an embodiment of the present invention.
Figure 4:
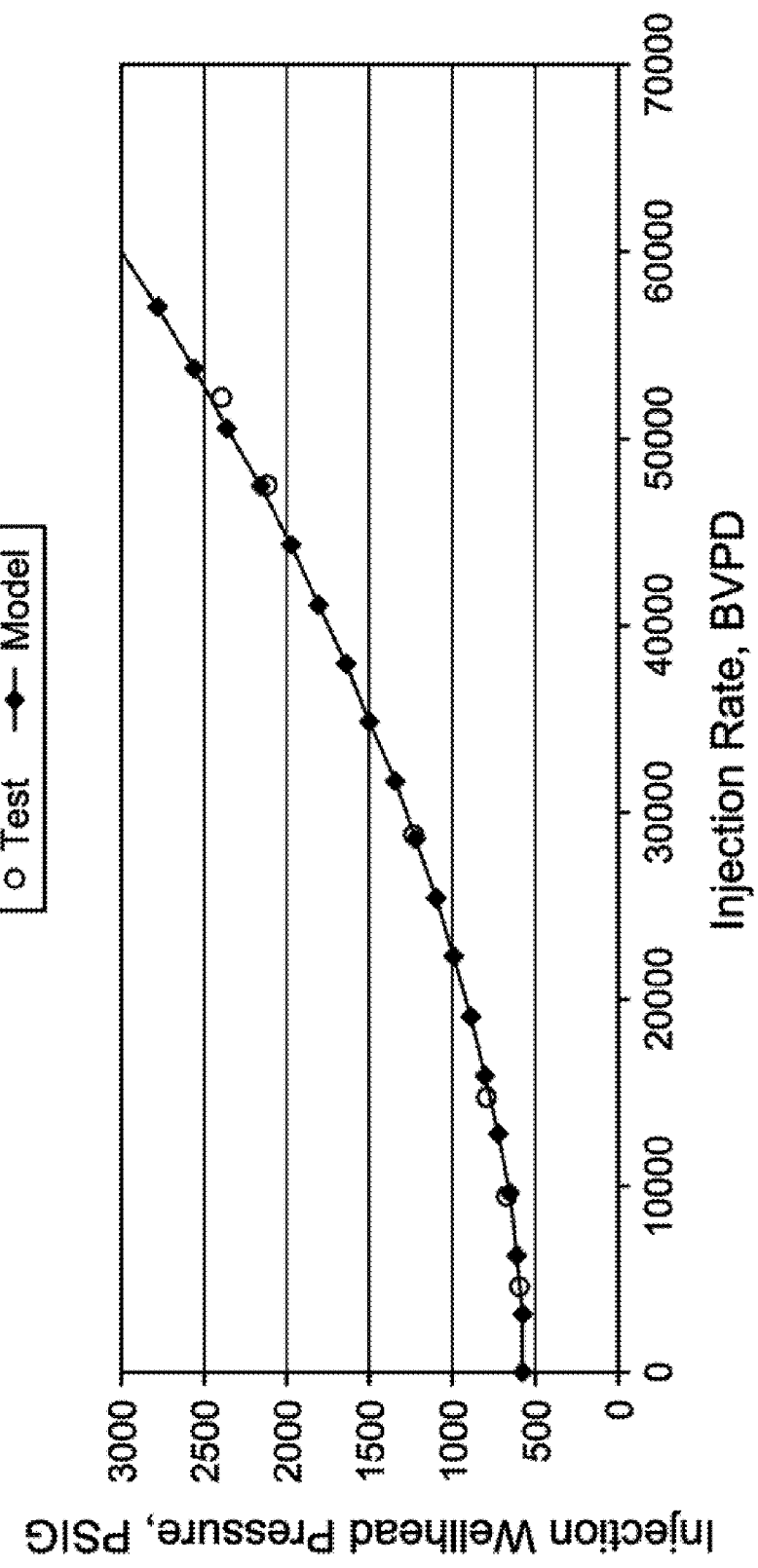
FIG. 4 is a schematic diagram graphically illustrating an injection well model calibration according to an embodiment of the present invention.
Figure 5:
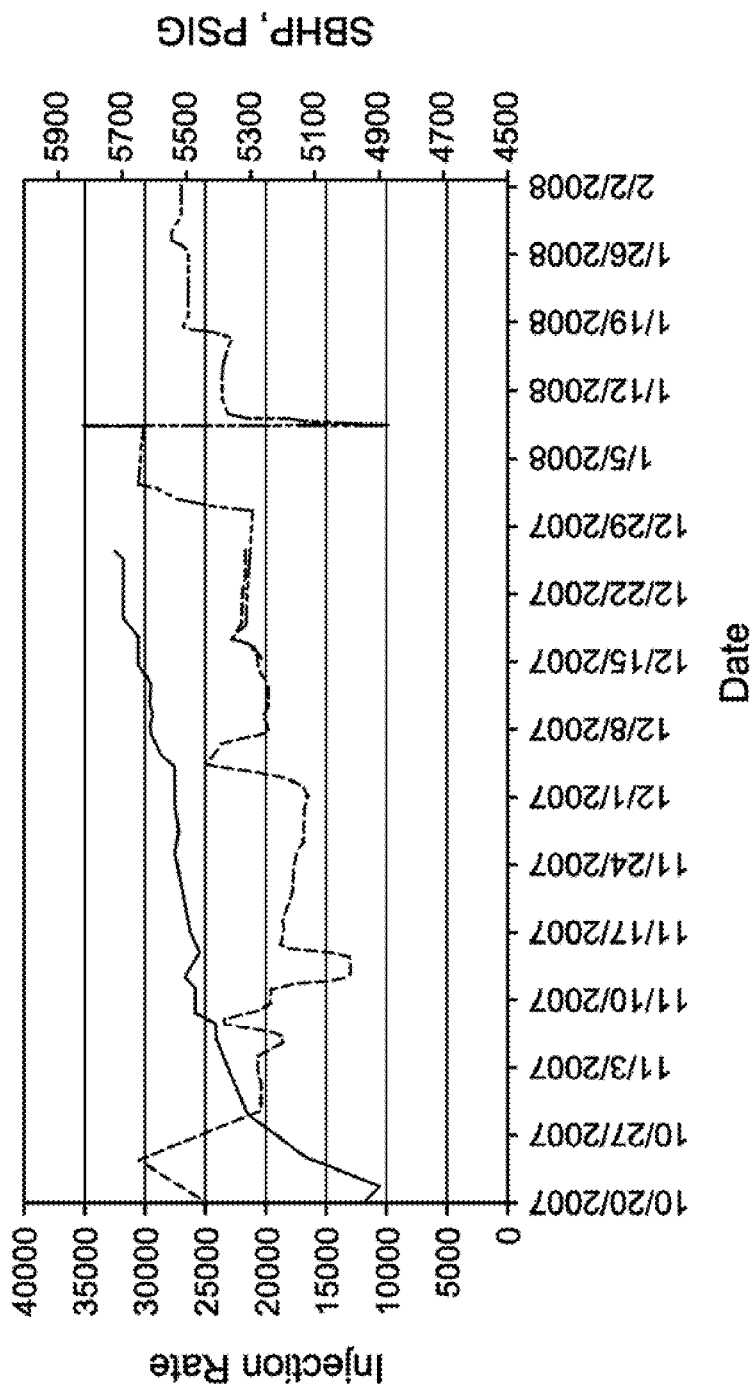
FIG. 5 is a schematic diagram graphically illustrating model calculated real-time static reservoir pressure according to an embodiment of the present invention.
Figures 6A, 7A:
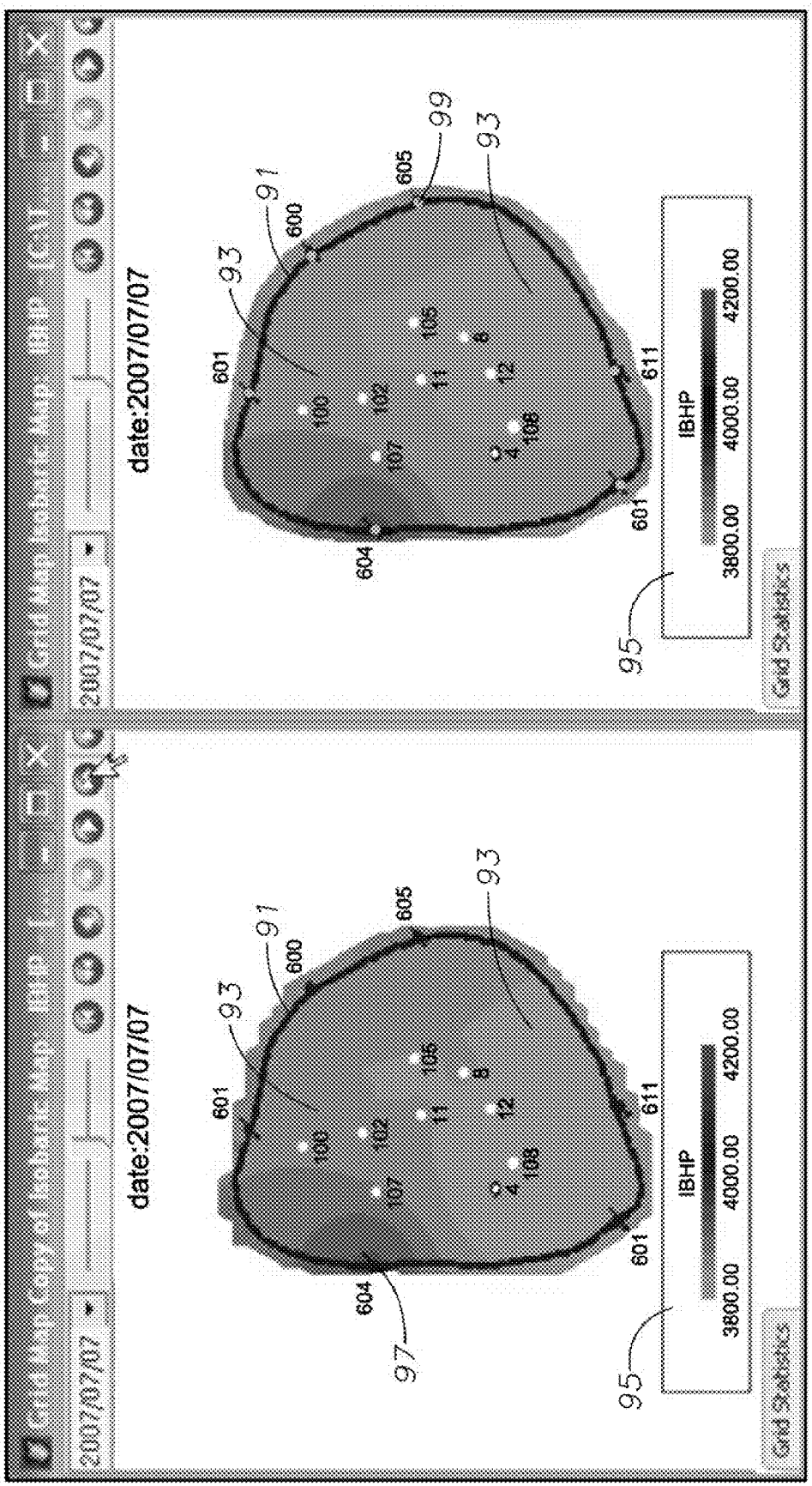
FIG. 6A-C are a series of schematic diagrams of a graphical user interface displaying a series of isobaric maps with injection rate bubbles overlaid thereon to illustrate time lapse pressure progression according to an embodiment of the present invention.
FIG. 7A-C are a series of schematic diagrams of a graphical user interface displaying a series of isobaric maps with cumulative injection rate bubbles overlaid thereon to illustrate time lapse pressure progression according to an embodiment of the present invention.
Figures 6B, 7B:
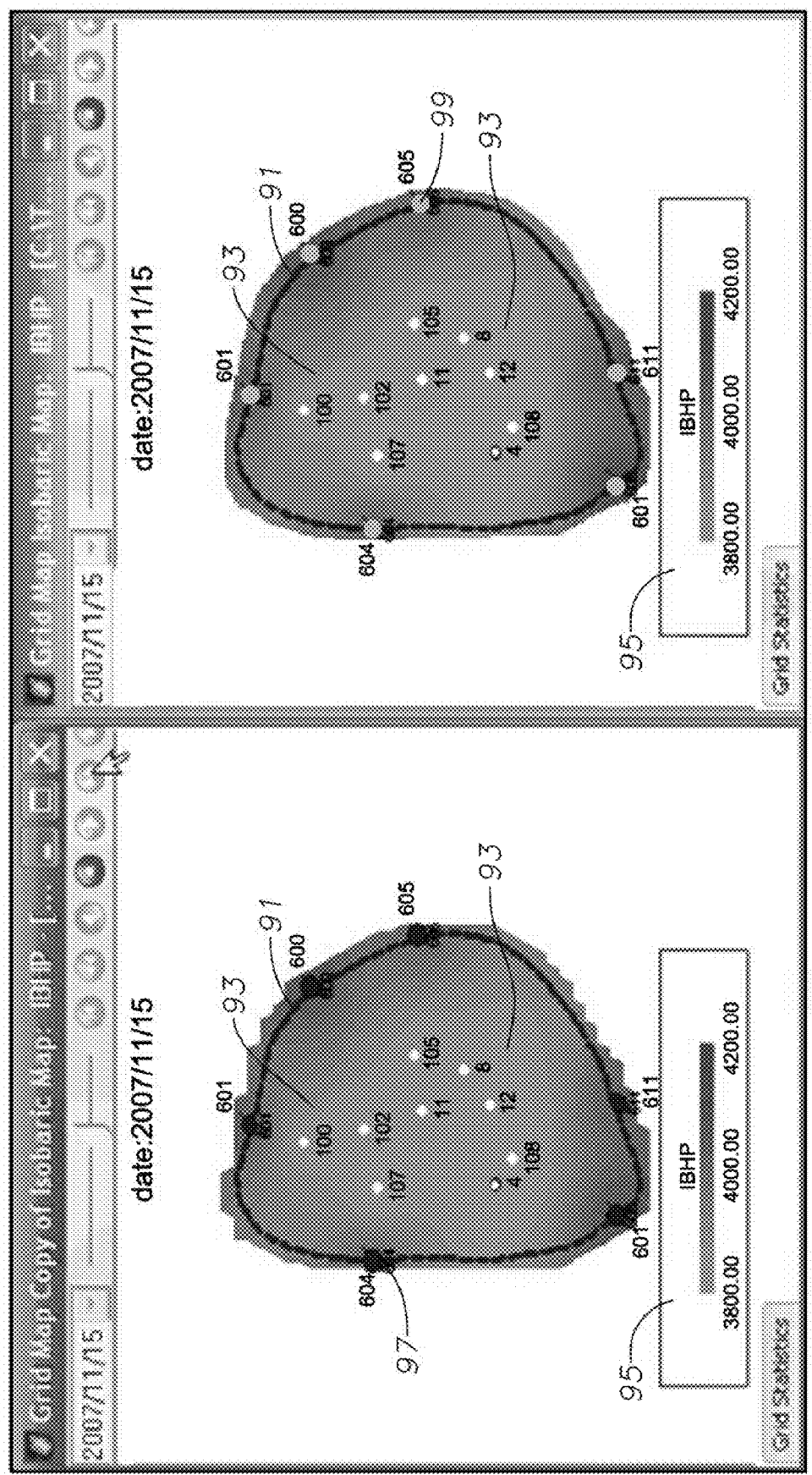
Figures 6C, 7C:
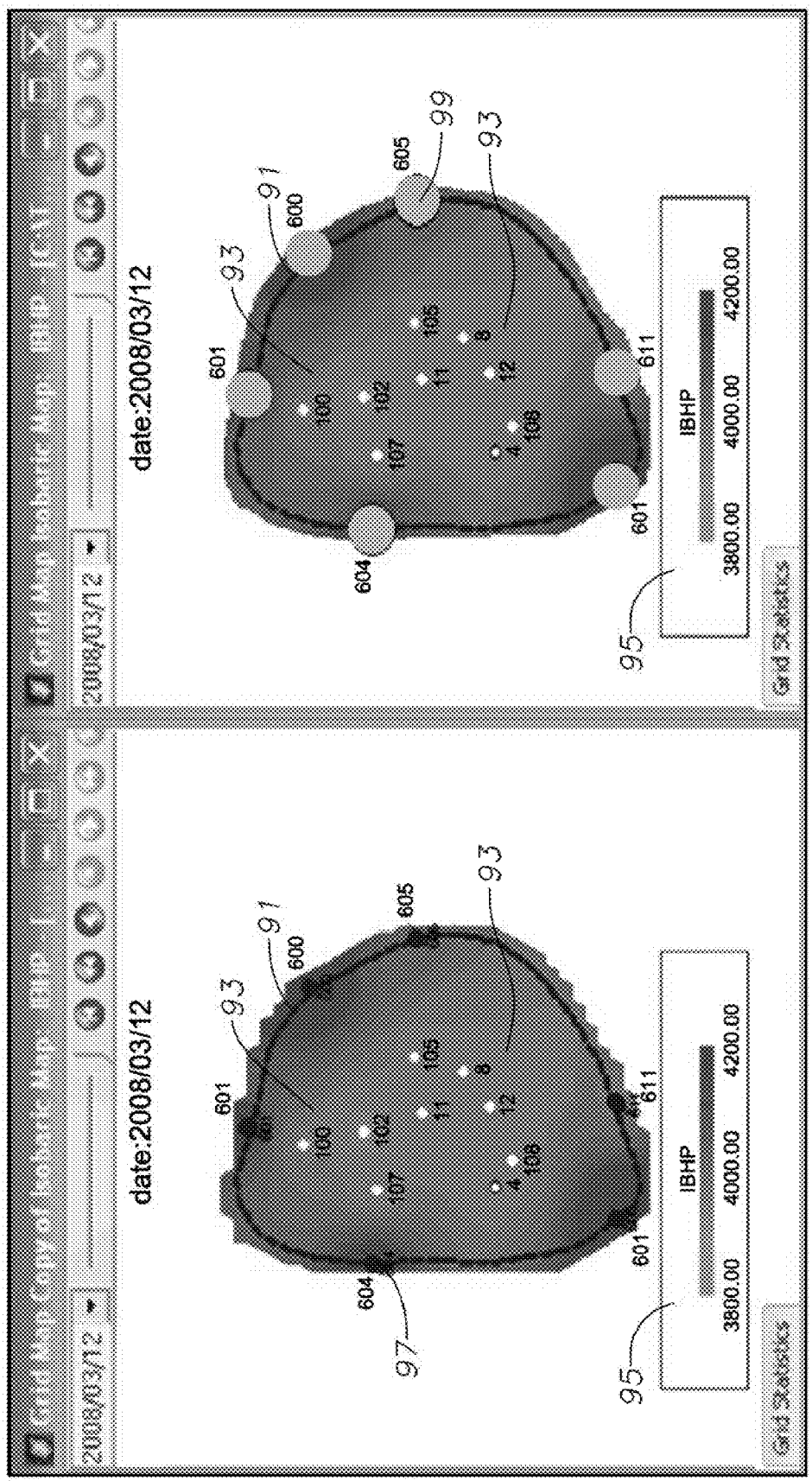

More specifically, as illustrated in FIG. 1, according to an embodiment of the present invention, a system 30 to provide real-time reservoir management of at least one, but preferably a plurality of reservoirs 21 across one or more fields 23, can include a reservoir management computer 31 located, for example, at a central engineering facility 32. The computer 31 can contain or otherwise include a processor 33, memory 35 coupled to the processor 33 to store software and database records therein, for example, in the form of a personal computer having a user interface or in the form of a server serving multiple user interfaces 37. The system 30 can also include a user interface 37 which can include a graphical display 39 for displaying graphical images, and a user input device 41 as known to those skilled in the art, to provide a user access to manipulate or access software and database records. Accordingly, the user interface 37 can be either directly connected to the computer 31 or through a network (e.g., local area network 38), as known to those skilled in the art. The system 30 can further include a database 43 stored in the memory 45 (internal or external, networked, or non-networked) of a database server 47, for example, either in direct communication with the reservoir management computer 31 or in communication through network 38; or in memory 35 of the computer 31. The database 43 can contain various data including: geographic location and communication related data of each of a plurality of producer wells 25, observation wells 27, and injection wells 29 (FIG. 1); one or more process facility models 51, gathering network models 53, injection, production, and observation well models 55, and reservoir models 57 (FIGS. 2-3); time related production and observation well data including measured static downhole pressure data for each of a select number of production and observation wells 25, 27; time related injection well data including measured wellhead pressure and injection rate data, calculated well injectivity index data, and calculated static downhole pressure data, for each of the injection wells 29; and other parameters as known to those skilled in the art, utilized in individually and collectively for managing the reservoirs 21 and fields 23, described in more detail below.

It should be understood that the memory 35, 45, can include volatile and nonvolatile memory known to those skilled in the art including, for example, RAM, ROM, and magnetic or optical disks, just to name a few. It should also be understood that the configuration of the reservoir management computer 31 and database server 47 is given by way of example in FIG. 1 and that other types of servers or computers configured according to various other methodologies known to those skilled in the art of computer systems can be used. Particularly, the servers 31 and 47, shown schematically in FIG. 1, for example, each represent a single computer or server, or a server cluster or server farm, and are not limited to any individual physical computer or server. The server site may be deployed as a server farm or server cluster managed by a serving hosting provider. The number of computers or servers and their architecture and configuration may be increased based on usage, demand and capacity requirements for the system 30. Further, although preferably centrally located, such servers can be distributed to enhance throughput, etc. Still further, the data stored in memory 35, 45 may be time domain based and frequency domain based data, i.e., data being saved, over time. Dynamic data is generally represented in the time domain. For example, as will the described later, the pressure and injection rate related data can be stored with a timestamp so that it may be represented as a function of time. At least some of this information can also be represented in frequency domain, generally in a far more compact manner, but generally at the cost of loosing some detail.

The system 30 can include a wireless communication network 61 including, for example, one or more satellites 63 and a plurality of satellite transceivers 65, 67, 69, 71, providing communication between their respective production, observation, and injection wells 25, 27, 29, and the reservoir management computer 31. Note, although use of wireline communication is within the scope of the present invention, wireless communications is generally preferred over wireline outside of the vicinity of the central facility 32 due to logistical problems associated with establishing wireline communications at the reservoirs 21 that are geographically situated in areas of the world having relatively austere conditions.

The system 30 can also include reservoir management program code 81 stored in memory 35 of the reservoir management computer 31. The program code 81, according to an embodiment of the system 30, is adapted to perform various operations to include gathering or otherwise collecting real-time data to include well pressure and injection rate data, for example, from a plurality of injection wells 29, and real-time static downhole pressure data, for example, from a plurality of production and/or observation wells 25, 27; and performing real-time reservoir management to include, for example:

calibrating an injection well model for each of a plurality of injection wells 29 responsive to the collected real-time injection rate and wellhead pressure data, estimating real-time static (e.g., bottom hole) reservoir pressure for each of the plurality of injection wells 29 responsive to the respective calibrated injection well model and responsive to respective real-time current surface injection rate and wellhead pressure data, and generating real-time automated isobaric pressure maps, for example, by combining the estimated (calculated) real-time static reservoir pressure for each of the plurality of injection wells 29 with the measured real-time static downhole reservoir pressure data measured for each of a plurality of producer and/or observation wells 25, 27.

Note, the reservoir management program code 81 can be in the form of microcode, programs, routines, and symbolic languages that provide a specific set for sets of ordered operations that control the functioning of the hardware and direct its operation, as known and understood by those skilled in the art. Note also, the reservoir management program code 81, according to an embodiment of the present invention, need not reside in its entirety in volatile memory, but can be selectively loaded, as necessary, according to various methodologies as known and understood by those skilled in the art of computer systems.

According to an embodiment of the present invention, a typical workflow can include the real-time data gathering, transmission of data to engineering personnel, data analysis, and decision-making. Utilizing the reservoir management program code 81, the real-time wellhead pressure and injection rate data can be collected from preferably all injection wells 29 and sent to engineers' desktops (e.g., user interface 37) through one or more communication networks (e.g., networks 61 and 38). Similarly, wellhead and downhole pressure and temperature data can be collected in real-time from preferably all producers and observation wells 25, 27. High frequency sampling of collected data, e.g., taken every few seconds, can be stored in the central database 43 for extended well performance tracking. FIG. 1 illustrates an exemplary structure to provide continuous reservoir pressure monitoring using wellhead and downhole gauges or other sensors installed across several wells 25, 27, and to provide the real-time reservoir pressure and temperature measurements to an engineer's desktop. Note, according to a preferred configuration, the pressure values are measured in real-time using permanent downhole monitoring systems (PDHMS) installed across several monitoring wells. According to the preferred configuration, the real-time data including, rate, pressure and temperature, are collected across the entire network from each reservoir 21 and sent to the central producing facility 32 and is spatially matched using, for example, an integrated surface and subsurface model(s) for both production and injection systems as shown, for example, FIG. 3.

According to the exemplary workflow, the data analysis can include three main steps: As perhaps best shown in FIG. 4, the first step can include injection well model calibration using, for example, multi-rate injectivity tests to estimate a well injectivity index for each injection well model 55. As perhaps best shown in FIG. 5, the second step can include utilizing the calibrated model to estimate real-time static reservoir pressure for each injection well 29. As perhaps best shown in FIGS. 6A-C and FIGS. 7A-C, the last step can include generating automated real-time isobaric maps 91, preferably with injection rate bubbles 97 and cumulative injection bubbles 99 overlaid as shown. This step can be accomplished by combining real-time reservoir pressure data measured using downhole gauges across the producing and observation wells 25, 27, with the model calculated real-time static reservoir pressure for each injection well 29. Current injection rate and cumulative injection bubbles 97, 99, can then be added to the automated isobaric maps 91 to relate pressure changes to changes in injection rates. These steps/operations and others are provided in more detail below.

Figure 9A:
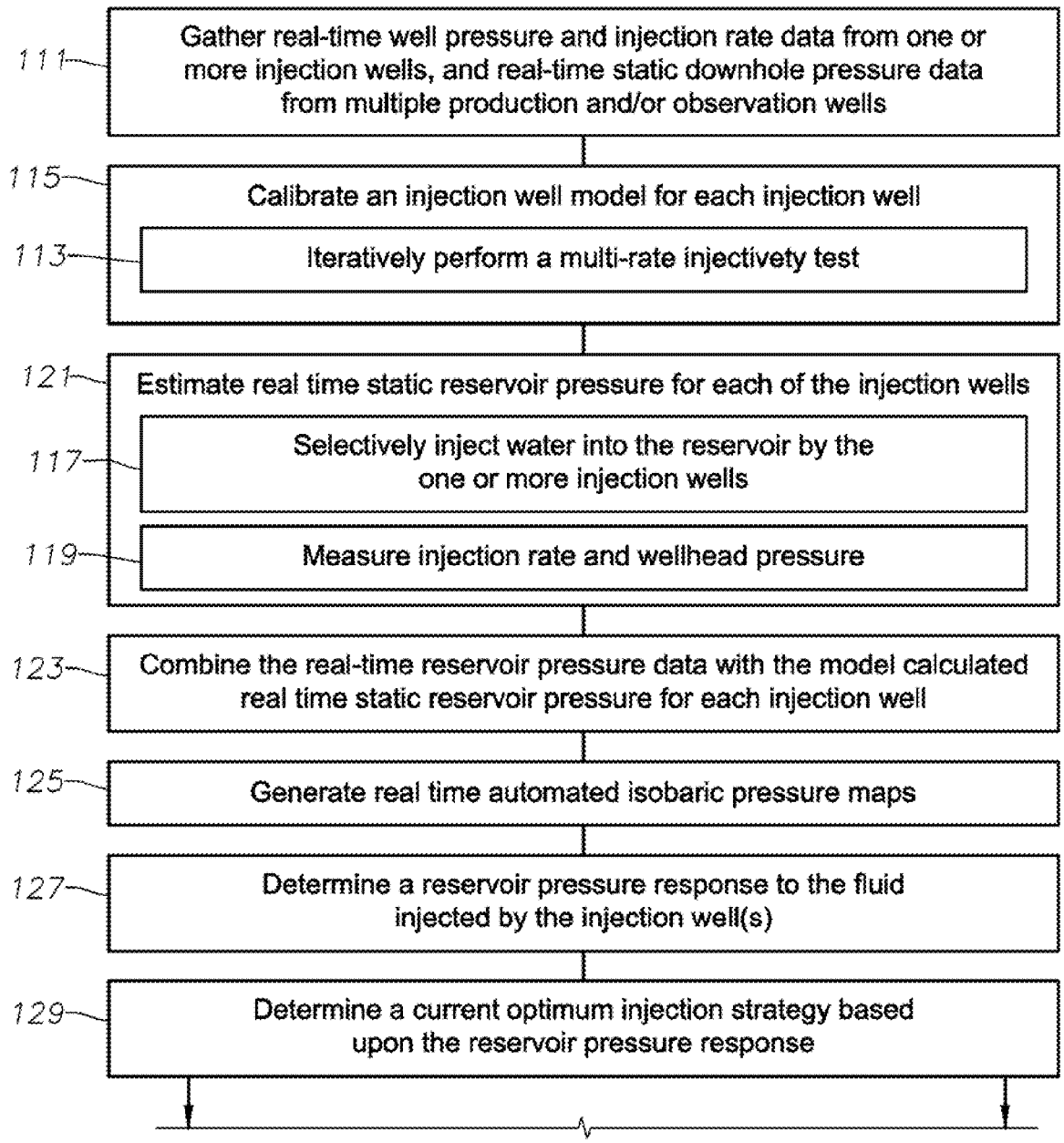
FIG. 9 is a schematic flow diagram of a method of providing real-time reservoir management of one or more reservoirs across one or more fields according to an embodiment of the present invention.
Figure 9B:
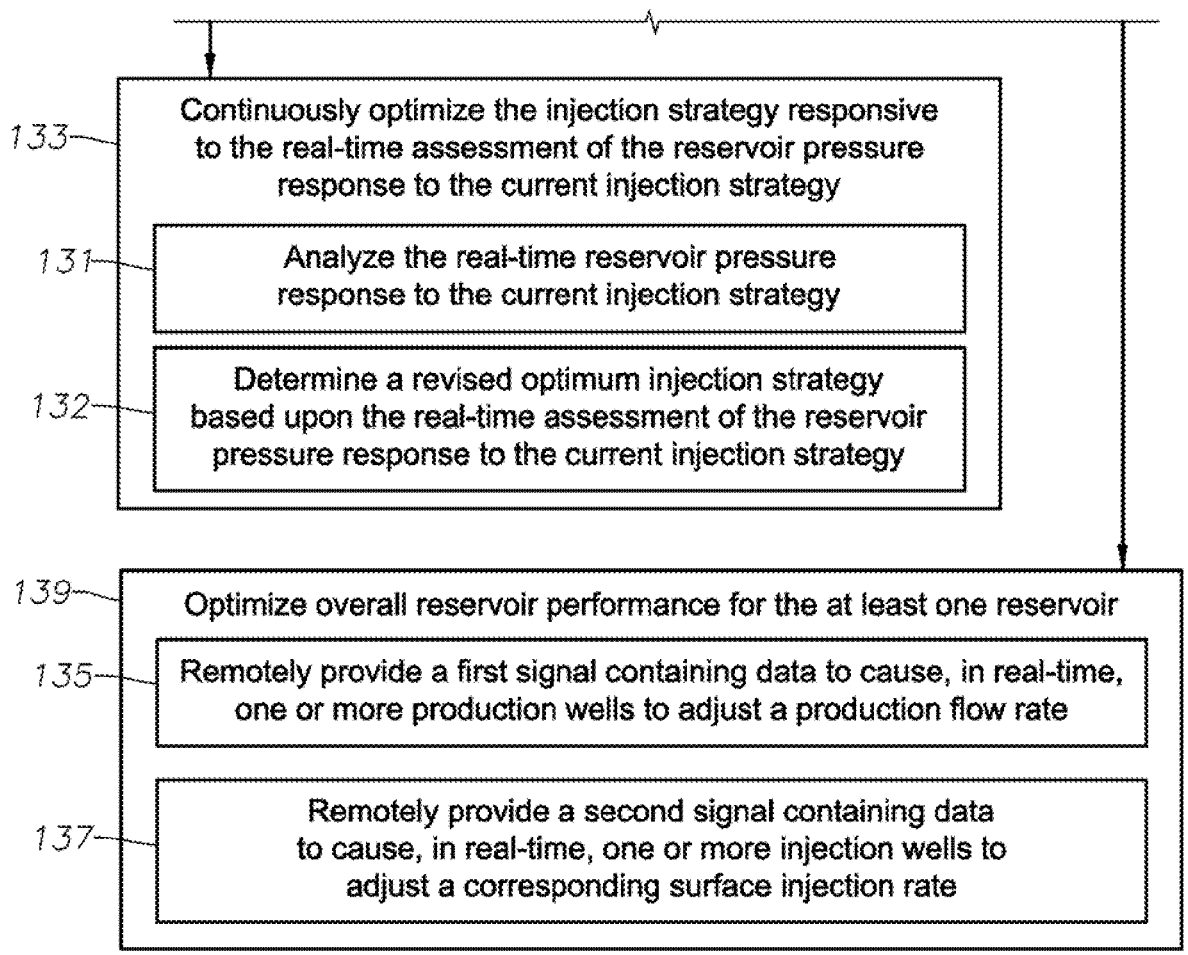
Figure 10:
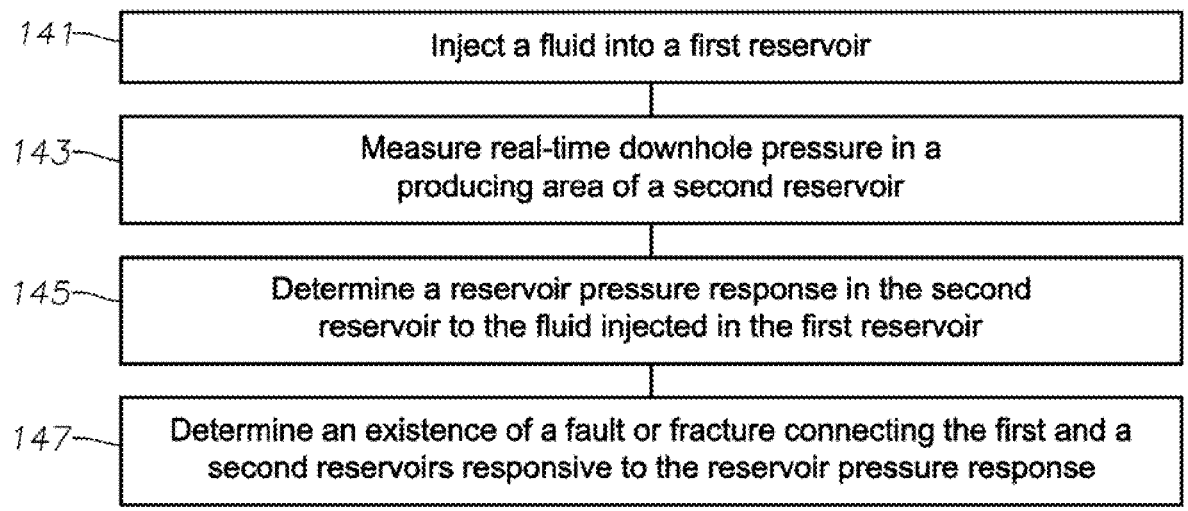
FIG. 10 is a schematic flow diagram of a method of providing real-time reservoir management of one or more reservoirs across one or more fields according to an embodiment of the present invention.

FIG. 9 provides a high-level flow diagram illustrating a method (and operations) to provide real-time reservoir management of a plurality of reservoirs 21 across one or more fields 23. According to the illustrated embodiment of the present invention, the method/operations can include gathering or otherwise collecting real-time data to include well pressure and injection rate data, for example, from a plurality of injection wells 29, and real-time static downhole pressure data, for example, from a plurality of production and/or observation wells 25, 27 (block 111); and performing real-time reservoir management. The real-time reservoir management can include, for example: iteratively performing a multi-rate injectivity test (block 113) to thereby calibrate an injection well model for each of a plurality of injection wells 29 (block 115); selectively injecting a fluid, e.g., water, into the reservoir under test by the injection well or wells 29 (block 117); measuring injection rate and wellhead pressure of the wells 29 (block 119); and estimating (calculating) real-time static (e.g., bottom hole) reservoir pressure for each of the injection wells 29 responsive to the respective calibrated injection well model 55 and responsive to respective real-time current surface injection rate and wellhead pressure data (block 121). The method/operations can also include combining the real-time reservoir pressure data measured using the downhole gauges/sensors across the producing and observation wells 25, 27, with the model calculated real-time static reservoir pressure for each injection well 29 (block 1123) to thereby generate real-time automated isobaric pressure maps 91 (block 125), illustrated, for example, in FIGS. 6A-C and FIGS. 7A-C. According to a preferred configuration, the automated isobaric pressure maps display isobaric pressure utilizing varying shades of a color such as green to illustrate the regions 93 of isobaric pressure, along with a reference chart 95; and can include overlaid thereon injection rate bubbles 97 (FIGS. 6A-C) and cumulative injection bubbles 99 (FIGS. 7A-C), which can be displayed to a user as a continuous stream over a preselected time period or as a continuous loop over the preselected time period to show a visual progression of the pressure changes.

This step/operation of calibrating the injection model can include using collected real-time injection rate and wellhead pressure data for more efficient, proactive real-time reservoir management. To calibrate the well model 55 with representative infectivity index and reservoir pressure values, multi-rate tests, as known to those skilled in the art, can be conducted for each injection well 29. An injectivity index determiner macro (not shown) within the program code 81, according to embodiment of the program code, can function to capture the multi-rate injectivity test results from the real-time data and to iterate by varying reservoir pressure and the injectivity index in the model until a reasonable match is obtained, as shown, for example, in FIG. 4. Once a good match is obtained, the estimated injectivity index value providing the match is stored in the well model 55, until another multi-rate test is recommended/performed, for example, based on change in well injection performance. Note, the multi-rate test can be conducted remotely by adjusting the well choke setting from the main control room (not shown) in the central facility 32. Beneficially, such flexibility can reduce the amount of effort necessary for production engineers to conduct multi-rate injection tests such that, when employing one or more embodiments of the present invention, the production engineers can conduct the tests for several wells 29 every day at no additional operating cost.

Once the well model 55 is calibrated with a representative injectivity index value, real-time reservoir pressure can be estimated from real-time wellhead pressure and surface injection rate, for example, as measured from the orifice meter (not shown) installed, for example, in every well 29. This process is simplified and automated by using a static downhole pressure determiner macro (not shown) within the program code 81, according to an embodiment of the program code, that can initialize the well model 55 with the current measured surface rate and injection wellhead pressure to thereby return a model calculated static reservoir pressure, as shown, for example, in FIG. 5. As the injection continues, each injection well 29 responds uniquely based on its injectivity index value. Note, the same concept can be used to estimate static reservoir pressure across producer wells 25, once production starts. Beneficially, the approach of calculating real-time reservoir pressure can provide a significant steppingstone to real-time reservoir management. The approach can not only help the engineers to better understand the fluid flow mechanics for better reservoir management through intelligent decisions, but can also reduce production and injection losses associated with wireline surveys, and can resultingly minimize operational interruptions caused by shutting down the wells 25.

According to an embodiment of the present invention, the step/operation of generating automated real-time isobaric maps, for example, with injection rate and cumulative injection bubbles 97, 99, overlaid as shown in FIGS. 6A-C and 7A-C, respectively, can be accomplished by combining real-time reservoir pressure data measured across the producing and observation wells 25, 27 (e.g., using downhole gauges/sensors), with the model calculated real-time static reservoir pressure for each injection well 29. Current injection rate and cumulative injection bubbles 97, 99, can be added to the base automated isobaric map 91 to relate the pressure changes to the injection rates. Mapping packages either external to, or within, the program code 81 can be used to provide engineers with the ability to generate animated isobaric maps 91 for each reservoir, for example, based on the stored real-time data.

Figure 8:
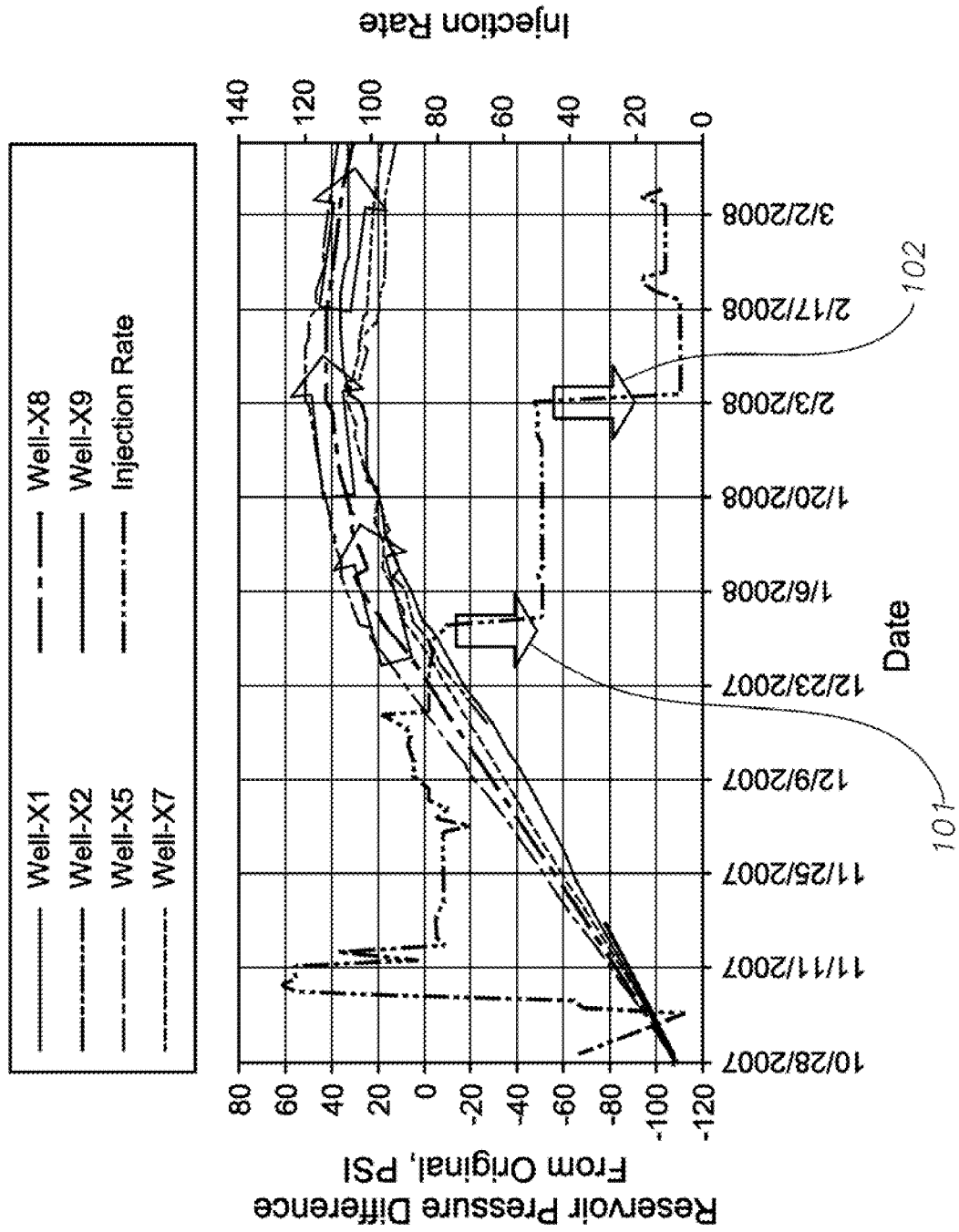
FIG. 8 is a schematic diagram of a graphical user interface showing real-time reservoir pressure monitoring and illustrating reservoir pressure control through injection rate reduction according to an embodiment of the present invention.

As perhaps best shown in FIG. 8, advanced real-time data plotting techniques can be used to visually display and to monitor reservoir pressure response, for example, to pre-injection, as measured in the producing area using the downhole pressure gauges/sensors installed, for example, in several of the wells 25, 27. Beneficially, the above described real-time animated isobaric maps 91 can help engineers optimize injection strategies based on real-time assessment of reservoir response to the recommended injection strategy. The example in FIG. 8 shows two reductions in injection rate at 101 and at 102, based on real-time reservoir pressure response observed across the producing area of a reservoir targeted for pre-injection.

The method/operations can also include determining a reservoir pressure response to the fluid injected by the at least one of the plurality of injection wells 29 (block 127), and determining a current optimum injection strategy responsive to the reservoir pressure response (block 129). The method/operations can further include iteratively assessing the real-time reservoir pressure response to the current injection strategy (block 131), and performing the step/operation of determining an optimum injection strategy (block 132) to thereby continuously optimize the injection strategy responsive to the real-time assessment of the reservoir pressure response to the current injection strategy (block 133). The method/operations can further include remotely providing a first signal containing data to cause, in real-time, one or more producer wells 25 to adjust a production flow rate (block 135), and/or remotely providing a second signal containing data to cause, in real-time, one or more injection wells 29 to adjust a corresponding surface injection rate (block 137) to thereby optimize overall reservoir performance for the at least one reservoir (block 139). Beneficially, such methodology can also allow for selective adjustment of the overall grade of the crude oil emanating from the reservoir 21.

Another benefit of real-time monitoring is the ability to identify the presence of faults or fractures connecting different reservoirs or connecting injection well and producer wells in the same reservoir. That is, the earlier such communication is discovered, the sooner injection can be modified to prevent excessive water production or unwanted oil migration between reservoirs 21. Accordingly, as perhaps best shown in FIG. 10, the method/operations can also include injecting a fluid (e.g., water) into a first reservoir 21 such as during a pre-injection test period (block 141), measuring real-time downhole pressure in a producing area of a second reservoir 21 during the pre-injection test period (block 143) to thereby determine a reservoir pressure response in the second reservoir to the fluid injected in the first reservoir (block 145); and determining an existence of a fault or fracture connecting the first and a second reservoirs 21 responsive to the reservoir pressure response (block 147).

It is important to note that while the foregoing exemplary embodiments of the present invention have been described in the context of a fully functional system and process, those skilled in the art will appreciate that the mechanism of at least portions of the present invention and/or aspects thereof are capable of being distributed in the form of reservoir management program product including a computer readable medium storing a set of instructions in a variety of forms for execution on a processor, processors, or the like, and that embodiments of the present invention apply equally regardless of the particular type of signal bearing media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and certain types of transmission type media such as, for example, digital and analog communication links capable of storing the set of instructions. Such media can contain, for example, both operating instructions and operations instructions described with respect to the program code 81, and the computer executable portions of the method steps according to the various embodiments of a method of providing real-time reservoir management of one or more reservoirs 21 across one or more fields 23, described above.

According to an embodiment of the computer readable medium, for example, having crude oil analysis and management program code 81 positioned thereon, such computer readable medium can include instructions that when executed by a processor, controller, or other form of computer (e.g., computer 31), cause the computer to perform the operations of gathering or collecting real-time data to include, for example, well pressure and injection rate data from a plurality of injection wells 29; retrieving or otherwise receiving real-time injection rate and wellhead pressure data either directly from a plurality of injection wells 29 or indirectly from a database (e.g., database 43); retrieving or otherwise receiving real-time static downhole pressure data from a plurality of production and/or observation wells 25, 27; and calibrating an injection well model 55 for each of a plurality of injection wells 29 responsive to the real-time injection rate and wellhead pressure data. The operation of calibrating an injection well model 55 can include iteratively varying reservoir pressure and infectivity index values in the injection well model 55 until obtaining a substantial match between data produced by the model 55 and data produced, for example, by a multi-rate infectivity test, to thereby determine an injectivity index value providing for the substantial match, and storing the injectivity index value providing for the substantial match responsive to obtaining the substantial match.

The operations can also include estimating real-time static (e.g., bottom hole) reservoir pressure for each of the plurality of injection wells 29 responsive to the respective calibrated injection well model 55 and responsive to real-time (current) surface injection rate and wellhead pressure data; combining the estimated (calculated) real-time static reservoir pressure for each of the plurality of injection wells 29 with the measured real-time static downhole reservoir pressure data measured for each of a plurality of producer and/or observation wells 25, 27, to thereby generate real-time automated isobaric pressure maps 91; and generating the real-time automated isobaric pressure maps 91. The operation of generating isobaric pressure maps 91 can include overlaying current injection rate bubbles 97 on the generated isobaric maps 91 to relate pressure changes to changes in injection rates. The operation of generating isobaric pressure maps 91 can also, or alternatively include, overlaying cumulative injection bubbles 99 on the generated isobaric maps 91 to relate cumulative pressure changes to changes in injection volume.

The operations can also include determining a reservoir pressure in response to the fluid injected by the at least one injection well during a pre injection test, and determining an optimum injection strategy responsive to the reservoir pressure response. The operations can further include assessing the real-time reservoir pressure response to the current injection strategy, and iteratively performing the step of determining an optimum injection strategy to thereby continuously optimize the injection strategy responsive to the real-time assessment of the reservoir pressure response to the current injection strategy.

This application is related to U.S. Provisional Patent Application No. 61/050,226, titled "System, Program Product, And Related Methods For Performing Automated Real-Time Reservoir Pressure Estimation Enabling Optimized Injection And Production Strategies," filed on May 3, 2008, incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, although the description primarily focuses on water injection, embodiments of the present invention are applicable to select other forms of fluid injection.

The invention claimed is:

1. A method of providing real-time reservoir management of one or more reservoirs across one or more fields, the method comprising the steps of:

calibrating an injection well model for each of a plurality of injection wells positioned in at least one reservoir responsive to collected real-time injection rate and wellhead pressure data associated therewith;

estimating by a computer, static reservoir pressure for each of the plurality of injection wells responsive to the respective calibrated injection well model and responsive to respective real-time surface injection rate and wellhead pressure data;

forming by the computer, at least one isobaric pressure map of the at least one reservoir comprising pressure mapping data for a plurality of producer wells and the plurality of injection wells responsive to the step of estimating static reservoir pressure for each of the plurality of injection wells and responsive to measured real-time reservoir pressure measured for each of a plurality of producer wells, to include combining the estimated real-time static reservoir pressure for each of the plurality of injection wells with measured real-time reservoir pressure data measured for each of the plurality of producer wells; and displaying the at least one isobaric pressure map on a display to provide for real-time reservoir pressure monitoring.

2. A method as defined in claim 1, further comprising the steps of:

injecting a fluid into the at least one reservoir by at least one of the plurality of injection wells defining at least one pre-injection test well during a pre-injection test period to thereby define a pre-injection test;

measuring injection rate and wellhead pressure of the at least one pre-injection test well when conducting the pre-injection test;

measuring real-time downhole pressure in a producing area of the at least one reservoir during the pre-injection test to thereby determine a reservoir pressure response to the fluid injected by the at least one pre-injection test well during the pre injection test; and determining an optimum injection strategy responsive to the reservoir pressure response.

3. A method as defined in claim 2, wherein the optimum injection strategy is a current injection strategy, and wherein the method further comprises the steps of:

analyzing real-time reservoir pressure response to the current injection strategy;

determining a revised optimum injection strategy responsive to the real-time analysis of the reservoir pressure response to the current injection strategy; and iteratively performing the steps of analyzing the real-time reservoir pressure response and determining a revised optimum injection strategy to thereby continuously optimize the injection strategy over time.

4. A method as defined in claim 2, further comprising the steps of:

remotely transmitting a first signal containing data to cause at least one producer well to adjust a production flow rate in real-time responsive to determining the optimum injection strategy to thereby optimize overall reservoir performance for the at least one reservoir; and remotely transmitting a second signal containing data to cause at least one injection well to adjust an associated surface injection rate in real-time responsive to determining the optimum injection strategy to thereby optimize overall reservoir performance for the at least one reservoir.

5. A method as defined in claim 1, wherein the at least one reservoir includes a first and a second reservoir, and wherein the method further comprises the steps of:
- injecting a fluid into the first reservoir during a pre-injection test period;
- measuring real-time downhole pressure in a producing area of the second reservoir during the pre-injection test period to thereby determine a reservoir pressure response in the second reservoir to the fluid injected in the first reservoir; and
- determining an existence of a fault or fracture connecting the first reservoir and a second reservoir responsive to the reservoir pressure response of the second reservoir.

6. A method as defined in claim 1, wherein the step of calibrating an injection well model includes:
- performing a multi-rate injectivity test for each of the plurality of injection wells to collect the injection rate and wellhead pressure data, real-time;
- iteratively varying reservoir pressure and an injectivity index in the injection well model responsive to the collected injection rate and wellhead pressure data for each of the plurality of injection wells; and
- selecting an injectivity index substantially matching the collected injection rate and wellhead pressure data for each of the plurality of injection wells.

7. A method as defined in claim 6,
- wherein the step of performing a multi-rate injectivity test includes remotely adjusting a well choke setting; and
- wherein the multi-rate injectivity test is performed daily on a plurality of injection wells for each of a corresponding plurality of producer wells, observation wells, or producer and observation wells, to thereby systematically update the respective plurality of calibration well models.

8. A method as defined in claim 1, wherein the step of calibrating an injection well model includes:
- iteratively varying reservoir pressure and injectivity index values in the injection well model until obtaining a substantial match between data produced by the well model and data produced by the multi-rate injectivity test to thereby determine an injectivity index value providing for the substantial match; and
- storing the injectivity index value providing for the substantial match responsive to obtaining the substantial match.

9. A method as defined in claim 1, wherein the step of estimating static reservoir pressure for each of the plurality of injection wells includes for each of the plurality of injection wells the steps of:
- measuring real-time wellhead pressure and surface injection rate; and
- returning a model calculated real-time static reservoir pressure.

10. A method as defined in claim 1, wherein the step of forming at least one isobaric pressure map includes the steps of:
- measuring real-time reservoir pressure data for each of the plurality of producer wells and at least one observation well; and
- generating a time-sequenced series of isobaric pressure maps defining an isobaric map animation to thereby enhance user visualization of pressure changes across that lead one reservoir.

11. A method as defined in claim 1, wherein the step of forming at least one isobaric pressure map includes the step of:
- overlaying current injection rate bubbles on the at least one generated isobaric map to relate pressure changes to changes in injection rates.

12. A method as defined in claim 1, wherein the step of forming at least one isobaric pressure map includes the step of:
- overlaying cumulative injection bubbles on the at least one generated isobaric map to relate pressure changes to changes in injection volume.

13. A method as defined in claim 1, wherein the steps of calibrating the plurality of injection well models, estimating static reservoir pressure, and forming at least one isobaric pressure map are performed as part of a pre-operational injection test cycle to thereby determine optimized initial production conditions prior to initiating operational production of the at least one reservoir.

14. A method as defined in claim 1,
- wherein the steps of calibrating the plurality of injection well models, estimating static reservoir pressure, and forming at least one isobaric pressure map are performed substantially continuously to provide substantially continuous updates of static bottom hole pressure for each of the plurality of producer wells and the plurality of injection wells; and
- wherein the steps of calibrating the plurality of injection well models, estimating static reservoir pressure, and forming at least one isobaric pressure map are performed without performing a wireline survey.

15. Reservoir management program product to provide real-time reservoir management of a plurality of reservoirs across one or more fields, the program product comprising a set of instructions stored on a tangible computer readable medium, that when executed by a computer, cause the computer to perform the operations of:
- calibrating an injection well model for each of a plurality of injection wells positioned in at least one reservoir responsive to real-time injection rate and wellhead pressure data associated therewith;
- calculating static reservoir pressure for each of the plurality of injection wells responsive to the respective calibrated injection well model and responsive to respective surface injection rate and wellhead pressure data; and
- forming at least one isobaric pressure map of the at least one reservoir comprising pressure mapping data for a plurality of producer wells and at least one injection well responsive to the operation of calculating static reservoir pressure for each of the plurality of injection wells and responsive to measured real-time reservoir pressure measured for each of a plurality of producer wells, to include combining the calculated real-time static reservoir pressure for the at least one injection well with producer well reservoir pressure data measured for each of the plurality of producer wells.

16. Reservoir management program product as defined in claim 15, wherein the operations further comprise:
- receiving real-time downhole pressure in a producing area of the at least one reservoir during a pre-injection test;
- determining a reservoir pressure response to fluid injected by at least one pre-injection test well during the pre injection test responsive to the real-time downhole pressure; and
- determining an optimum injection strategy responsive to the reservoir pressure response.

17. Reservoir management program product as defined in claim 16, wherein the optimum injection strategy is a current injection strategy, and wherein the operations further comprise:

analyzing real-time reservoir pressure response to the current injection strategy;

determining a revised optimum injection strategy responsive to the real-time analysis of the reservoir pressure response to the current injection strategy; and iteratively performing the operations of analyzing the real-time reservoir pressure response and determining a revised optimum injection strategy to thereby continuously optimize the injection strategy over time.

18. Reservoir management program product as defined in claim 16, wherein the operations further comprise:

remotely providing a first signal containing data to cause at least one producer well to adjust a production flow rate in real-time responsive to determining the optimum injection strategy to thereby optimize overall reservoir performance for the at least one reservoir; and remotely providing a second signal containing data to cause the at least one injection well to adjust an associated surface injection rate in real-time responsive to determining the optimum injection strategy to thereby optimize overall reservoir performance for the at least one reservoir.

19. Reservoir management program product as defined in claim 15, wherein the at least one reservoir includes a first and a second reservoir, and wherein the operations further comprise:

providing a data signal including instructions to cause the at least one injection well to inject a fluid into the first reservoir during a pre-injection test period;

receiving data indicating measured real-time downhole pressure in a producing area of the second reservoir during the pre-injection test period to thereby determine a reservoir pressure response in the second reservoir to the fluid injected in the first reservoir; and determining an existence of a fault or fracture connecting the first and the second reservoirs responsive to the reservoir pressure response of the second reservoir.

20. Reservoir management program product as defined in claim 15, wherein the operation of calibrating an injection well model includes:

iteratively varying reservoir pressure and injectivity index values in the injection well model until obtaining a substantial match between data produced by the model and data produced by the multi-rate injectivity test to thereby determine an injectivity index value providing for the substantial match; and storing the infectivity index value providing for the substantial match responsive to obtaining the substantial match.

21. Reservoir management program product as defined in claim 15, wherein the operation of forming at least one isobaric pressure map includes one or more of the following operations:

providing data to visually overlay current injection rate bubbles on the at least one generated isobaric map to relate pressure changes to changes in injection rates; and providing data to visually overlay cumulative injection bubbles on the at least one generated isobaric map to relate pressure changes to changes in injection volume.

22. A system to providing real-time reservoir management of a plurality of reservoirs across one or more fields, the system comprising:

a communication network;

a plurality of injection wells each positioned to inject water into a portion of a reservoir, and each including:
a wellhead pressure sensor to measure wellhead pressure,
an injection rate sensor to measure an injection rate of the water when being injected, and
a transceiver adapted to communicate wellhead pressure sensor and injection rate sensor data over the communication network;

a plurality of monitoring wells each including:
a permanent downhole monitoring sensor to provide real-time measured pressure values of reservoir pressure adjacent the respective monitoring well, and
a transceiver to communicate real-time measured pressure value data over the communication network;

a reservoir management computer positioned remote from the plurality of injection wells and the plurality of monitoring wells and in communication with the communication network to provide real-time reservoir management of the plurality of reservoirs, the computer including:
a processor, and
memory coupled to the processor; and reservoir management program code stored in the memory of the reservoir management computer, the reservoir management program code including instructions that when executed by the reservoir management computer, cause the computer to perform the operations of:
calibrating an injection well model for each of a plurality of injection wells positioned in at least one reservoir responsive to real-time injection rate and wellhead pressure data associated therewith,
calculating static reservoir pressure for each of the plurality of injection wells responsive to the respective calibrated injection well model and responsive to respective surface injection rate and wellhead pressure data, and
forming at least one isobaric pressure map of the at least one reservoir comprising pressure mapping data for a plurality of producer wells and the plurality of injection wells responsive to the operation of calculating static reservoir pressure, the operation of forming including combining the calculated real-time static reservoir pressure for each of the plurality of injection wells with producer well reservoir pressure measured for each of a plurality of producer wells and a plurality of observation wells.

23. A system as defined in claim 22, wherein the operations further comprise:

receiving real-time downhole pressure in a producing area of the at least one reservoir during a pre-injection test;

determining a reservoir pressure response to fluid injected by at least one pre-injection test well during the pre injection test responsive to the real-time downhole pressure; and determining an optimum injection strategy responsive to the reservoir pressure response.

24. A system as defined in claim 22, wherein the operation of calibrating an injection well model includes:

iteratively varying reservoir pressure and injectivity index values in the injection well model until obtaining a substantial match between data produced by the model and data produced by the multi-rate injectivity test to thereby determine an injectivity index value providing for the substantial match; and storing the injectivity index value providing for the substantial match responsive to obtaining the substantial match.

25. A tangible computer readable medium that is readable by a computer to provide real-time reservoir management of a plurality of reservoirs across one or more fields, the computer readable medium storing a set of instructions that, when executed by the computer, cause the computer to perform the following operations:

calibrating an injection well model for each of a plurality of injection wells positioned in at least one reservoir responsive to real-time injection rate and wellhead pressure data associated therewith;

calculating static reservoir pressure for each of the plurality of injection wells responsive to the respective calibrated injection well model and responsive to respective surface injection rate and wellhead pressure data; and forming at least one isobaric pressure map of the at least one reservoir comprising pressure mapping data for a plurality of producer wells and at least one injection well responsive to the operation of calculating static reservoir pressure for each of the plurality of injection wells and responsive to measured real-time reservoir pressure measured for each of a plurality of producer wells, to include combining the calculated real-time static reservoir pressure for the at least one injection well with producer well reservoir pressure data measured for each of the plurality of producer wells.

* * * * *